May 17, 1938.  F. R. BORGFELDT  2,117,873
ELECTRIC CLOCK
Original Filed May 3, 1935
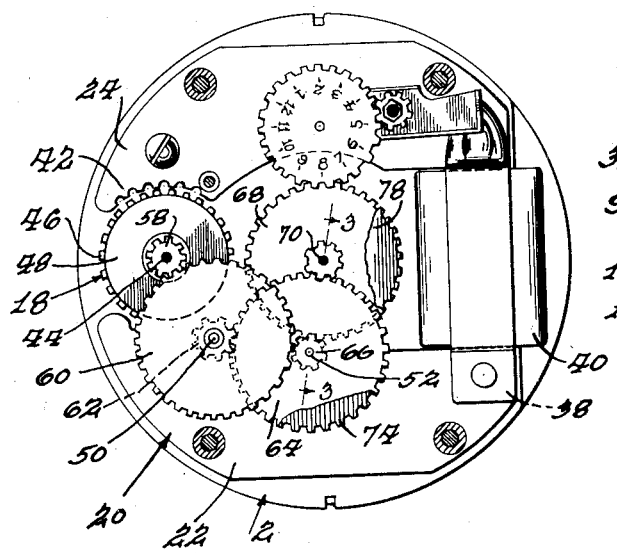
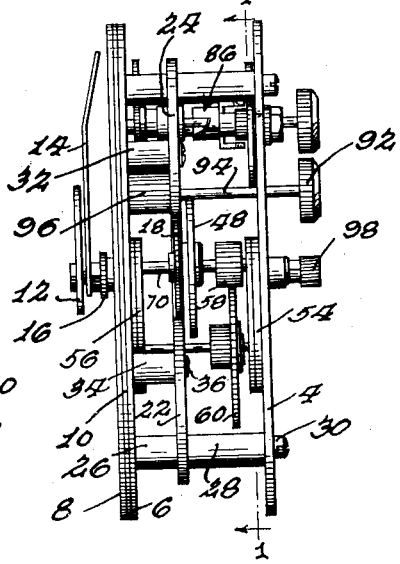
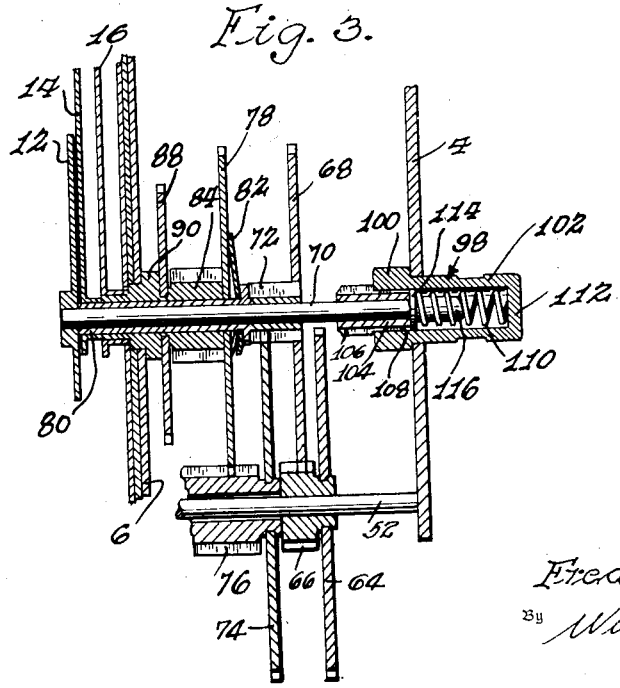
Inventor
Frederic R. Borgfeldt,
By Wilkinson, Huxley,
Byron Wright
Attorney Patented May 17, 1938

2,117,873

UNITED STATES PATENT OFFICE 2,117,873

ELECTRIC CLOCK

Frederic R. Borgfeldt, Middlebury, Ind., assignor to Middlebury Electric Clock Corporation, Chicago, Ill., a corporation of Illinois Original application May 3, 1935, Serial No. 19,666. Divided and this application March 28, 1936, Serial No. 71,434

13 Claims. (Cl. 58—26)

The present invention relates to electric clocks and more in particular to novel starting means for the motors thereof, this application being a division of application Serial No. 19,666, filed May 3rd, 1935.

Among the objects of the present invention is to provide an electric clock which is simple in construction, which may be economically manufactured, and which is free from undesirable noises during its operation.

Another object of the present invention is to provide novel means in a motor driven clock mechanism for starting the rotor of this motor.

Still another object of the present invention is to provide novel starting means for the rotor of a non-self-starting synchronous motor. More particularly, the present invention includes the idea of providing a starter adapted to releasably engage one of the gears used in driving the second hand of the clock from the rotor.

The present invention also includes the idea of providing a novel starting means for the rotor of a non-self-starting synchronous motor which serves as a bearing for a shaft in the clock mechanism.

Still another object within the purview of the present invention is to provide a novel starting means for the rotor of a non-self-starting synchronous motor which serves as a bearing for the second shaft which is driven by the rotor through a train of gears, the starting means also serving as a lubricant reservoir to provide proper lubrication for the second shaft.

Other objects, features, capabilities and advantages are comprehended by the invention, as will later appear and as are inherently possessed thereby.

Referring to the drawing:

Figure 1 is a view in cross section of the clock mechanism taken in the plane represented by line 1—1 of Figure 2 of the drawing;

Figure 2 is a view in elevation of the side of the clock mechanism; and

Figure 3 is a detached view in cross section taken in the plane represented by line 3—3 of Figure 1 of the drawing.

Referring now more in detail to the drawing, an electric clock made in accordance with the present invention is shown as comprising a clock mechanism generally referred to as 2, which comprises a frame having rear plate 4 and a front plate 6 upon which is mounted a dial 8 having the clock numerals painted or otherwise placed thereon, a pad 10 being interposed between the dial 8 and the front plate 6. The clock is provided with the second, minute and hour hands 12, 14 and 16, respectively, mounted for movement over the dial and driven by a train of gears, as will be hereinafter more fully disclosed.

The train of gears for the clock mechanism is driven by means of a synchronous motor of the non-self-starting type, this motor comprising rotor 18 and a field structure. The field structure includes a yoke 20 which, in the embodiment disclosed, comprises two plates 22 and 24 mounted between the plates 4 and 6 at a plurality of points between pillars 26 and 28 which are staked to the plates 6 and 4, respectively, and have their ends protruding into openings provided in the yoke 20, these pillars being maintained in position to rigidly mount the yoke 20 as by means of bolts 30 passing downwardly therethrough and engaging threads in the pillars 26. The plates 22 and 24 are further rigidly held by pillars 32 and 34 having an end staked to the front plate 6 and interlocking within openings provided in these plates, bolts 36 being provided in threaded engagement with the pillars for securely holding the ends of these plates in operative position.

Mounted on the central part of the yoke 20 and spanning the gap (not disclosed) between plates 22 and 24 is a plurality of strips of metal 38 around which is a winding 40 forming an exciter for the motor, this winding being connected through suitable leads to a source of alternating current. The yoke, together with the laminations 38, provide a core for the winding 40 to provide an alternating flux at the ends of plates 22 and 24. The plates 22 and 24 terminate in opposite relation to the axis of the rotor 18 and are each formed with a plurality of polar projections 42, the plates being unlaminated and the polar projections being unwound. The rotor 18 is fixedly mounted upon the shaft 44 for rotation and is likewise formed with a plurality of unlaminated and unwound polar projections 46. Adjacent the rotor 18 and freely mounted upon the shaft 44 is an inertia member 48 which is provided with a pin (not diclosed) projecting within a slot (not disclosed) formed in the rotor 18, this inertia member 48 being provided to secure uniform rotation of the rotor even though there may be fluctuations in the alternating current circuit.

The rotor shaft 44, as well as shafts 50 and 52 spaced therefrom, are mounted in the bearings 54 and 56 which are secured to plates 4 and 6, respectively, each of which bearings comprises an outer plate of compressed fibrous material especially treated to retain lubricant, and an inner metallic plate adjacent plates 4 and 6 which are formed with openings to receive the ends of these shafts and to retain a sufficient amount of lubricant to properly lubricate these shafts over a considerable length of time.

Fixed upon the rotor shaft 44 is a pinion 58 adapted to mesh with a gear 60 formed from compressed fibrous material in order to provide a smooth and noiseless operating gear train. This gear 60 is mounted on the shaft 50 and is provided with a pinion 62 adjacent thereto which meshes and drives gear 64 fixed to shaft 52. A pinion 66 is fixed to shaft 52 adjacent gear 64 which meshes with gear 68 which is fixed to a seconds shaft 70 which extends forwardly through the front plate 6 and has the second hand 12 mounted thereon. The gear 68 has a pinion 72 fixed thereto and meshing with the gear 74 freely mounted upon the shaft 52, which gear has a pinion 76 fixed thereto which meshes with gear 78 movably mounted upon the sleeve 80 rotatably mounted upon the seconds shaft 70. Sleeve 80 is driven by gear 78 through the spring clutch 82 and has mounted upon its outer end the minute hand 14. Pressed on the sleeve 80 is a pinion 84 which meshes with a gear (not disclosed) which is mounted on the front plate of the clock mechanism and which, through a pinion mounted adjacent thereto, operates a gear for the alarm, generally designated as 86. The pinion of the gear (not disclosed) meshes with a gear 88 which is fixed upon sleeve 90, this sleeve being freely mounted upon the sleeve 80 which extends through the front plate and dial and has the hour hand 16 mounted upon its outer end. Resetting of the mechanism is effected through the resetting knob 92 mounted on the shaft 94 having pinion 96 mounted thereon which, through the gear and pinion (not disclosed), operate or rotate gear 88 and pinion 84 to reset the clock hands.

In an electric clock of the type herein disclosed, the desirability of providing a motor of the non-self-starting synchronous type is well-known, and with such motors it is necessary to provide a starting device for initially rotating the rotor to a speed above the synchronous speed thereof, after which the rotor assumes its normal speed of rotation in the alternating current circuit. The present clock mechanism accordingly comprehends providing a starter for initially rotating the rotor, such a starting means comprising a hollow starter knob 98 mounted in an opening in the back plate 4. This sleeve has an enlarged shoulder 100 adapted to abut the back plate 4 and is provided with an outer restricted body portion 102 projecting through the plate, which portion is adapted to be grasped for rotation thereof. Fitted within the enlarged portion 100 is a hub 104 of a pinion 106 which provides a bearing for the rear end of the seconds shaft 70. This pinion 106 is in abutting relation with the enlarged portion 100 and the hub is formed with spaced leaves 108 substantially the pitch diameter of the pinion and forming air passages therebetween communicating with the chamber of the hollow knob 98. The enlarged part 100 of the knob 98 is normally held in abutting relation with the inside face of the back plate by means of a coil spring 110 disposed between the end 112 of the knob and the enlarged head 114 of a pin 116, the head 114 normally abutting the shaft 70. It will be clearly seen that this starting mechanism forms a suitable bearing for the inner end of the seconds shaft 70 and that the inner cavity provides a suitable reservoir for maintaining a supply of lubricant which may seep between the walls of the knob and the enlarged head 100 to properly lubricate the inner end of the shaft 70.

When it is desired to start the rotor, the starter 98 is pressed inwardly against the action of coil spring 110 until the spur or pinion gear 106 meshes with gear 64. Inward movement of the knob 98 is limited by engagement of the rear wall 112 with the shank of pin 116 which also serves to position coil 110. Rotation of the starter or knob 98 causes rotation of gear 64 which meshes with pinion 62 fixed in relation to gear 60 which meshes with pinion 58 mounted on the rotor shaft 44. The starter or knob 98 may be spun and, through the gears enumerated, causes the rotor to rotate to a speed above its normal operating speed, whereupon the same may be released and the rotor allowed to fall into its normal synchronous operating speed.

While I have herein described and upon the drawing shown an illustrative embodiment of the invention, it is to be understood that the invention is not limited thereto but may comprehend other constructions, arrangements of parts, details and features without departing from the spirit of the invention.

I claim:

1. In an electric clock having an indicating hand, a shaft for operating the same, a motor having a rotor, a gear train operated by said rotor for operating said shaft, and starting means having means providing a bearing for said shaft, said starting means being movably mounted with respect to said shaft and having means engageable with one of said gears for rotating said rotor to start the motor.

2. In an electric clock having indicating hands, a clock mechanism having a train of gears and a shaft for moving said hands, a motor having a rotor for operating said train of gears, and starting means having means providing a bearing for said shaft, said starting means being movably mounted with respect to said shaft and having means engageable with one of said gears for rotating said rotor to start the motor.

3. In an electric clock having indicating hands, a train of gears for moving said hands, a shaft having certain of said gears mounted thereon, a motor having a rotor for operating said train of gears, and starting means having means providing a bearing for said shaft, said starting means being movably mounted with respect to said shaft and having means engageable with one of said gears for rotating said rotor to start the motor.

4. In an electric clock, the combination of a frame, a shaft, a starting knob, said starting knob being mounted in said frame for rotary and axial movement with respect to said shaft and providing a bearing for said shaft in said frame, said knob having a hollow compartment providing a lubricant reservoir for lubricating said shaft.

5. In an electric clock, the combination of a frame, a seconds shaft, a starting knob, said starting knob being mounted in said frame for rotary and axial movement with respect to said shaft and providing a bearing for said shaft in said frame, said knob having a hollow compartment providing a lubricant reservoir for lubricating said shaft.

6. In an electric clock, the combination of a shaft, a motor, a gear train operated by said motor for moving said shaft, a starting knob having a pinion mounted therein adapted to engage one of said gears for starting said motor, said pinion providing a bearing for said shaft, said knob having a hollow compartment providing a lubricant reservoir for lubricating said shaft.

7. In an electric clock, the combination of a seconds shaft, a motor, a gear train operated by said motor for moving said shaft, a starting knob having a pinion mounted therein adapted to engage one of said gears for starting said motor, said pinion providing a bearing for said shaft, said knob having a hollow compartment providing a lubricant reservoir for lubricating said shaft.

8. In an electric clock, the combination of a motor having a rotor, a seconds shaft, a gear train operated by said rotor and including gears for rotating said seconds shaft, and starting means normally disengaged from said gear train but movable into engagement with one of said last named gears for rotating said rotor to start the motor, said starting means having means providing a bearing for said shaft.

9. In an electric clock, the combination of a motor having a rotor, a seconds shaft, a gear train operated by said rotor and including gears for rotating said seconds shaft, and starting means normally disengaged from said gear train but mounted on said seconds shaft and movable into meshing relation with one of said last named gears for rotating said rotor to start the motor.

10. In an electric clock, the combination of a back plate, a motor having a rotor, a seconds shaft, a gear train operated by said rotor and including gears for rotating said seconds shaft, a starting knob mounted in said back plate and providing a bearing for said seconds shaft, said knob being movable with respect to said back plate and having a pinion movable into meshing relation with one of said last named gears for rotating said rotor to start the motor.

11. In an electric clock, the combination of a back plate, a motor having a rotor, a seconds shaft, a gear train operated by said rotor and including gears for rotating said seconds shaft, a starting knob movably mounted in said back plate providing a bearing for said seconds shaft, said knob having abutment means engaging said plate when in its normal inoperative position, said knob having a pinion adapted to mesh with one of said last named gears for rotating said rotor to start the motor and a spring normally holding said knob in said abutting relation with said plate, said pinion on said knob being moved out of meshing relation under the impulse of said spring when said knob is released.

12. In an electric clock, the combination of a shaft, a motor, a gear train operated by said motor for moving said shaft, a starting knob having a pinion for starting said motor through said gear train, and said pinion having means providing a bearing for said shaft.

13. In an electric clock, the combination of a shaft, a motor, a gear train operated by said motor for moving said shaft, a starting knob having a pinion for starting said motor through said gear train, and said pinion having means providing a bearing for said shaft, said knob having a hollow compartment providing a lubricant reservoir for lubricating said shaft.

FREDERIC R. BORGFELDT.